(12) United States Patent
Wagh et al.

(10) Patent No.: US 7,799,733 B2
(45) Date of Patent: Sep. 21, 2010

(54) PROCESS FOR PREPARING HIGH SURFACE AREA CARBON

(75) Inventors: Deepali Dattatray Wagh, Maharashtra (IN); Girish Vilas Arabale, Maharashtra (IN); Mahesh Prakash Kulkarni, Maharashtra (IN); Imtiaz Sirajuddin Mulla, Maharashtra (IN); Vijayamohanan Kunjukrishanapillai, Maharashtra (IN); Subhash Pundalik Vernekar, Maharashtra (IN); Ratnesh Kumar Jha, Maharashtra (IN); Nalini Edgar Jacob, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 1315 days.

(21) Appl. No.: 10/814,857

(22) Filed: Mar. 31, 2004

(65) Prior Publication Data

US 2005/0221981 A1    Oct. 6, 2005

(51) Int. Cl.
*C01B 31/08* (2006.01)
(52) U.S. Cl. .............. 502/427; 502/430; 502/432; 502/423; 502/426
(58) Field of Classification Search .......... 502/423, 502/426, 427, 430, 432
See application file for complete search history.

(56) References Cited

U.S. PATENT DOCUMENTS 5,064,805 A * 11/1991 Otowa .................. 502/427
5,162,286 A * 11/1992 MacDowall ............. 502/425
6,057,262 A *  5/2000 Derbyshire et al. ....... 502/423

FOREIGN PATENT DOCUMENTS

| EP | 0 649 815 | 4/1995 |
|----|-----------|--------|
| EP | 1 211 702 | 6/2002 |
| GB | 435345 | 3/1936 |
| GB | 965709 | 8/1964 |
| GB | 1094914 | 12/1967 |

OTHER PUBLICATIONS

Hu, Z., et al. "Novel activation process for preparing highly microporous and mesoporous activated carbons" *Carbon* (2001) vol. 39, pp. 877-886.
Hu, Z., et al. "Preparation of high-surface-area activated carbons from coconut shell" *Microporous and Mesoporous Materials* (1999) vol. 27, pp. 11-18.

* cited by examiner

*Primary Examiner*—Stuart Hendrickson
(74) *Attorney, Agent, or Firm*—Ladas & Parry LLP

(57) ABSTRACT

The present invention provides a process for making activated carbon having BET surface area up to 2000 m²/g with pore diameter in the range 17-21 Å suitable for fabricating fuel cell and ultracapacitor electrode from coconut shell by treating carbon granules obtained from coconut shells with chemical activating agents like zinc chloride or potassium hydroxide at the room temperature range 500-800° C. in a dynamic flow of gases like $N_2$ or $CO_2$ for 6-24 h followed by a specific cooling pattern to room temperature. Use of such activated carbon enables the fabrication of high performance ultracapacitor electrodes in $H_2SO_4$ as exemplified by capacitance values like 180 F/g without the use of any normal metal additives such as $RuO_2$ or $IrO_2$.

22 Claims, No Drawings

PROCESS FOR PREPARING HIGH SURFACE AREA CARBON

FIELD OF THE INVENTION

The present invention relates to a process for obtaining high surface area carbon useful for fuel cell and ultracapacitors electrodes. More particularly the present invention provides a process for preparing high surface area carbon using coconut shell. The high capacitance carbon obtained is useful for fabricating fuel cell and ultracapacitor electrodes. The present invention describes an improved process for obtaining high surface carbon (2000±100 m$^2$/g) with several desirable features of structure, porosity and pore size distribution with an average pore diameter in the range 18-21 Å so that enhance performance electrodes can be easily fabricated. More particularly the invention describes an improved process for obtaining high surface area carbon from lignocellulosic material like coconut shell, which is suitable for the fabrication of electrodes in fuel cells and ultracapacitors.

BACKGROUND OF THE INVENTION

Carbonaceous materials have been particularly popular owing to their large surface area, ease of preparation from a wide range of sources, such as coconut shell, wood powder, peat, bone, coal tar, resin and resorcinol formaldehyde and related polymers, to yield active material with a Brunauer-Emmet-Teller (BET) surface area ranging between 1000-1500 m$^2$/g. The resultant carbon has several superior properties including fast adsorption, especially in the case of large amount of gas molecules and ions in solution to enable their advantages during its application in electrochemical double layer capacitor, fuel cell electrodes and hydrogen storage. Among available resources, coconut shells provide an attractive source for the preparation of carbon with high surface area and also being an easily available raw material, the process becomes cost effective and environmentally sustainable. This activated carbon is highly pure with uniform pore size distribution, which makes them suitable for a variety of applications.

The preparation of high surface area carbon from coconut shell involves a sequence of procedures involving two major steps viz. carbonization and activation. Initially the coconut shells were treated with chemical activating agents for dehydration followed by prolonged pyrolysis to form carbonaceous materials, where these activating agents also help to reduce the formation of tar and other byproducts, thereby increasing the yield. The most widely used activating agents are alkali metal hydroxides, carbonates, chlorides, sulfides, thiocyanate and also inorganic acids. The carbonization step includes thermal decomposition of the coconut shell material, which eliminates non-carbon species producing a fixed carbon mass with random pore structure. Very fine and closed pores are created during this step. The next step involves the activation of carbonized sample. The purpose of activation is to open up and enlarge the existing closed pores by thermal treatment under a dynamic flow of gases such as carbon dioxide, steam, nitrogen, ammonia, and halogens depending upon the nature and application of the material. These gases in turn react with the surface functional groups to make them either acidic or basic and the weight loss during this activation is monitored to have an idea about the porosity change.

Reference is made to Microporous and Mesoporous Materials 27(1999) 11-18 wherein in the conversion of coconut shell to high surface area carbon using KOH in various ratios between the temperature range 600-800° C. has been extensively reported. Reference is also made to European Patent EP 649815 A1 26 Apr. 1995 wherein the carbon prepared by alkali solution treatment in the temperature range 800-1100° C. gives fine powder with highly microporous structure with average pore diameter 8-20 Å has been reported. The drawbacks of such methods are formation of potassium compounds that are unstable in the atmosphere of $CO_2$, $O_2$ and $H_2O$ moisture induces the changes in the micro structure, changes in the surface functional groups upon storage and high resistance due to carbonate formation. These carbonates also can clog at least some pores thus deleteriously affecting the performance. Moreover, the need of high temperature (700-1100° C.) limits the use of such reagents for efficient activation and compounds can be reduced to metallic potassium by carbon at this temperature. Reference is made to U.S. Pat. No. 6,013,208 Nakamura, et al. Jan. 11, 2000, wherein another manufacturing method for preparing carbonaceous material for electrical double layer capacitor from lignocellulosic material by using gases like halogen, steam and hydrogen at higher temperature range (800-1000° C.) is disclosed. The main drawback is that the presence of micro pores with attendant non-uniformity can cause too much of variation. Also, the high temperature halogen gas treatment makes the process corrosive and hazardous. Initially making halogenated carbon and again dehalogenating, makes the process time consuming and costly. Reference is made to Chinese Patent No. 25(2), 247-251 1997, wherein another important class of carbonaceous materials, the carbon areogels, is typically prepared from resorcinol-formaldehyde gels by supercritical drying and carbonization at higher temperatures <1000° C. The double layer capacitance was found to be 30 F/g. The main drawback of this work is that the supercritical method of drying makes the process hazardous and expensive for practical applications. Another limitation is that the high-pressure experimental set up is always cumbersome both to maintain and to use. Reference is also be made to Carbon 39(2001) 877-886, wherein the zinc chloride activation is carried out at high temperature (800-1000° C.) using the gases $N_2$, $CO_2$ and steam. The drawback of using steam is that it is very difficult to regulate the process due to uncontrollable kinetics.

Reference is made to GB Patent 435345, wherein improvements in or relating to the manufacture of activated carbon from the black ash residue from esparto grass using steam at 700-1000° C. have been reported. The drawback of using steam at high temperature is that it is very difficult to regulate the process due to uncontrolled kinetics. Reference is be made to GB Patent 965709, wherein the carbon prepared from anthracite using steam at 800-900° C. is reported. The surface area is very low (280 m$^2$/g) and the primary source of carbon is anthracite and more significantly, low surface area can give poor charge storage capability. Reference is also be made to GB Patent 1094914, wherein a process for the manufacture of porous carbon electrode for use in the air depolarized cell has been reported from the admixture of acetylene black, activated vegetable (coconut shell) carbon and polymethylacrylate as a binder. The invention does not describe activation parameters and the capacitance of the prepared carbon samples will be inferior as the binder may give high resistance. Reference is also made to EP 12111702 A1, wherein the activated carbon prepared from coconut shell using steam as a activating gas at 900-950° C. The surface area is in the range 2000-2500 m$^2$/g. The main drawback is that the capacitance is very low (0.8-1 F) and the activation of coconut shell is carried out at high temperature (930° C.)

using steam. The high resistance of this material will not allow fast charge delivery and hence the response time will be short.

OBJECTS OF THE INVENTION

The object of the present invention is to provide an improved process for preparation of high surface area activated carbon from coconut shell, for fabricating fuel cell and ultracapacitor electrodes with enhanced performance, which at the same time also obviates the drawbacks as detailed above.

Another object of present invention is to devise a simple route to activate the coconut shell carbon using either zinc chloride or potassium hydroxide sequentially as a chemical activating agent with $N_2$ or $CO_2$ as a carrier gas at a temperature ranging from 600-700° C.

Still another object of the present invention is to obtain the activated carbon with uniform pore size, at lower activation temperature (600-700° C.), which is active and useful in special relevance to the fabrication of fuel cell and ultracapacitor electrodes.

SUMMARY OF THE INVENTION

Accordingly, the present invention provides a process for the preparation of high surface area activated carbon from coconut shell, which comprises cleaning the coconut shells, drying the cleaned coconut shells, crushing the dried coconut shells, sieving the crushed coconut shell through 100-400 mesh to obtain uniform sized coconut shell powder, treating the shell powder with an activating agent, drying the treated coconut shell powder, carbonizing the powder in an inert atmosphere, cooling the activated carbon to the room temperature, removing the excess of activating agent by treating, washing with water bring the powder to neutral pH and drying the activated carbon to obtain the activated carbon.

In one embodiment of the invention, the activating agent is selected from he the group consisting of 250 mM-2M aqueous solutions of alkali metal hydrides, carbonates, chlorides, sulfides, thiocyanate of transition metals and inorganic acids preferably zinc chloride or potassium hydroxide.

In yet another embodiment of the invention, the inert gas used is selected from nitrogen and argon.

In yet another embodiment of the invention, the carbonization is carried out at a temperature in the range of 300-400° C. for 3-6 h, in an inert atmosphere and using different heating rates ranging from 5-20° C./min.

In another embodiment of the invention, the activation is carried out in a dynamic flow of inert or oxidizing gas (flow rate 20-200 ml/min) at 500-800° C. for 6-24 h at a heating rate of 5-20° C./min.

In another embodiment of the invention, the coconut shell is first cleaned mechanically to remove fibrous part therefrom followed by thorough rising with distilled water.

In yet another embodiment of the invention, the cleaned coconut shell is dried at a temperature in the range of 110-150° C. for 12-20 h.

In yet another embodiment of the invention, the crushed coconut shell powder is sieved through 100-400 mesh to obtain uniform sized particles.

In another embodiment of the invention, the treated coconut shell powder is dried at a temperature in the range of 100-200° C. for a period of 12-22 h.

In another embodiment of the invention, the excess activating agent is removed by treating with the dil. hydrochloric acid.

In another embodiment of the invention, the activated carbon powder obtained has a nitrogen adsorption isotherm at 77 K, a BET surface area of in the range 1500-2000 $m^2/g$ with average pore diameter 17-21 Å, layer capacitance in the range of 10-180 F/g.

DETAILED DESCRIPTION OF THE INVENTION

The present invention provides a process for obtaining activated carbon from coconut shell for fabricating fuel cell ultracapacitor electrodes comprises a sequence of steps such as cleaning, drying and crushing of coconut shells, impregnation with chemical activating agents, carbonization in an inert atmosphere, activation at temperature range (600-700° C.) in a dynamic gas flow, removal of the activating agent by washing with appropriate solvent and drying followed by determination of the surface area, porosity of the resultant activated carbon by nitrogen adsorption isotherm at 77K and the electrochemical measurements of the electrochemical capacitance.

The process of the invention comprises preparation of high surface area activated carbon from coconut shell by cleaning the coconut shell, first mechanically to remove the fibrous part, followed by thorough rinsing with distilled water. The cleaned coconut shell is then dried in an oven at 110-150° C. for 12-20 h and then crushed by any conventional means. The crushed coconut shell powder is then sieved through 100-400 mesh to obtain uniform sized particles which are then treated with an activating agent. The treated coconut shell powder is then dried at a temperature in the range of 100-200° C. for a period of 12-22 h. The dried powder is then carbonized in an inert atmosphere at a temperature in the range of 300-400° C. for 3-6 h using different heating rates ranging from 5-20° C./min and the carbonized powder is then cooled to room temperature. The carbonized powder is then activated in an inert or oxidizing gas atmosphere at different heating rates ranging from 5-20° C./min in the temperature range 500-800° C. The activated carbon is then cooled to room temperature and the excess of activating agent is removed by either treatment with dilute hydrochloric acid followed by washing with water till chlorides are removed or till pH is converted to neutral depending upon the chemical agent used for activation. The activated carbon is then dried.

The activating agent preferably comprises 250 mM to 2 M aqueous solution of alkali metal hydroxides, carbonates, chlorides, sulfides, thiocyanate of transition metals and also inorganic acids preferably zinc chloride or potassium hydroxide. The inert gas used is selected from nitrogen and argon and the carbonization preferably carried out at a temperature range of 300-400° C. for 3-4 h.

The activation is preferably carried out in a dynamic flow of inert or oxidizing gas (flow rate 20-100 ml/min) at 500-800° C. for 6-24 h at the heating rate 5-20° C./min. The carbon produced as per the procedure given herein was characterized by nitrogen adsorption isotherm at 77 K. The BET surface area of the sample is in the range 1500-2000 $m^2/g$ and average pore diameter 17-21 Å.

The carbon produced in the present invention is useful for the fabrication of fuel cell and ultracapacitor electrodes. The measurement of double layer capacitance was carried out by electrodes consisting of a the mixture of carbon (75±10 wt %), graphite (20±10 wt %) and binder (5 wt %) such as polyvinyl chloride (PVC), polyvinyl alcohol (PVA), ethyl cellulose, Teflon, Nafion on a mesh like titanium, stainless steel, nickel as a working electrode in 1 M $H_2SO_4$, 1 M KOH electrolyte using $Hg/Hg_2SO_4$, Hg/HgO as a reference electrode and Pt flag as a counter electrode. The cyclic voltammograms were recorded at different scan rates ranging from 5-500 mv/s. The double layer capacitance measured was in the range of 10-100 F/g.

The process of the invention is described hereinbelow with reference to illustrative examples, which should not be construed to limit the scope of the invention in any manner.

EXAMPLE-1

2 g of fine coconut shell powder was treated with 1M 20 ml zinc chloride solution. The mixture was dried in an oven at 150° C. for 20 h, and transfer in an alumina boat and pyrolyzed, in an inert atmosphere of $N_2$ with the flow rate 50 ml/min at 400° C. for 4 h (at heating rate 5° C./min). The obtained carbon was further sieved through 300-mesh size and activated in a programmed furnace in a dynamic flow of $N_2$ (flow rate 60 ml/min) at 600° C. (heating rate 10° C./min) for 15 h. To remove unreacted zinc chloride, it was stirred with 50 ml dil hydrochloric acid and washed several times with deionised water. The observed weight loss was in the range 75%. The obtained carbon was characterized by nitrogen adsorption isotherm at 77 K and the BET surface area was 2000 $m^2$/g with pore diameter 21 A°. The electrode was prepared by pasting the mixture of carbon (75 wt %), graphite (20 wt %) and teflon binder (5 wt %) on titanium mesh and used as working electrode for the electrochemical measurements. It was carried out in 1 M $H_2SO_4$ electrolyte using carbon as a working electrode, $Hg/Hg_2SO_4$ as a reference electrode and Pt flag as counter electrode. The double layer capacitance of the carbon was 180 F/g.

EXAMPLE-2

In this example 1 g of coconut shell powder treated with 0.5 M 10 ml of zinc chloride solution. The mixture was dried in an oven at 150° C. for 15 h and transferred in an alumina boat and pyrolyzed nitrogen atmosphere with flow rate 80 ml/min at 400° C. (heating rate 5° C.) for 5 h. Obtained carbon was sieved through 400 mesh and further used for activation. Activation was carried out in a dynamic flow of $CO_2$ gas at 700° C. for 20 h. To remove the zinc chloride, it was stirred with 50 ml dil hydrochloric acid and washed several times with deionised water. The weight loss observed was 65% The BET surface area was 1800 $m^2$/g. The electrochemical measurements were carried out with the obtained carbon. The electrode was prepared by pasting the mixture of carbon (75 wt %), graphite (20 wt %) and Polyvinyl chloride as a binder (5 wt %) on titanium mesh and used as working electrode 1 M $H_2SO_4$ electrolyte using $Hg/Hg_2SO_4$ as a reference electrode and Pt flag as counter electrode. The double layer capacitance of the carbon was in the range 65 F/g.

EXAMPLE-3

In this example, 3 g of fine coconut shell powder was treated with 1 M 10 ml potassium hydroxide pellets, the mixture was dried in an oven at 150° C. for 20 h, and followed by heating in $N_2$ atmosphere with the flow rate 50 ml/min at 400° C. for 4 h (at heating rate 5° C./min). The obtained carbon was further, sieved through 300-mesh size and activated in a programmed furnace in a dynamic flow of $N_2$ (flow rate 60 ml/min) at 600° C. (heating rate 10° C./min) for 15 h. The weight loss observed was 60%. The BET surface area was 1500 $m^2$/g with pore diameter 17 Å. The electrode was prepared by pasting the mixture of carbon (75 wt %), graphite (20 wt %) and teflon as a binder (5 wt %) on titanium mesh and used as working electrode for the electrochemical measurements. It was carried out in 1 M $H_2SO_4$ electrolyte using $Hg/Hg_2SO_4$ as a reference electrode and Pt flag as counter electrode. The double layer capacitance was 28 F/g.

EXAMPLE-4

In this example 0.5 M 20 ml potassium hydroxide was treated with 4 g of coconut shell powder. The mixture was dried in an oven at 150° C. for 15 h, transferred in an alumina boat and pyrolyzed nitrogen atmosphere with flow rate 80 ml/min at 400° C. heating rate 5° C. for 5 h. Obtained carbon was sieved through 400-mesh and further used for activation. Activation was carried out in a dynamic flow of $CO_2$ gas at 700° C. for 20 h. To remove the potassium hydroxide, it was stirred with 50 mM dil. hydrochloric acid and washed several times with water. The observed weight loss was 62% with BET surface area 1600 $m^2$/g and pore diameter 18 Å. The electrode was prepared by pasting the mixture of carbon (75 wt %), graphite (20 wt %) and polyvinyl chloride as a binder (5 wt. %) on titanium mesh and used as working electrode in 1 M 1 M $H_2SO_4$ electrolyte using $Hg/Hg_2SO_4$ as a reference electrode and Pt flag as counter electrode. The double layer capacitance was in the range 35 F/g.

Activated carbon prepared by the above method was further used for fabricating fuel cell electrodes as follows. Activated carbon was first platinated and used to prepare membrane electrode assemblies (MEA). MEAs were prepared by mixing 80% of platinated carbon, 15% graphite and 5% Nafion or Telfon binder on one side of carbon paper followed by hot pressing these electrodes and polymer electrolyte together. These MEAs were used in fuel cell stack and the measured power density as 218 mW/$cm^2$. Results obtained are summarized in Table 1.

TABLE 1

| Sample No. | Weight loss (%) | Surface area ($m^2$/g) | Capacitance (F/g) |
| --- | --- | --- | --- |
| 1 | 75 | 2000 | 180 |
| 2 | 65 | 1800 | 65 |
| 3 | 60 | 1500 | 28 |
| 4 | 62 | 1600 | 35 |

Table 1 shows the surface area of coconut shell carbon along with % weight loss and the double layer capacitance.

The Advantages of the Present Invention are:

One intrinsic advantage of this improved process is that activation is conducted at a lower temperature range 600-700° C., compared to prior arts at 800-1100° C.; thus enabling significant cost reduction of the preparation. A second advantage is related to the ease of control of the surface functional groups of the carbon where the initial potassium hydroxide or zinc chloride treatment can create acidic or basic sites. For fuel cell and ultracapacitor electrode the possibility of preparation of Pt or $RuO_2$ electrocatalyst especially within the pores of carbon to enable high performance is an added advantage.

We claim:

1. A process for the preparation of high surface area activated carbon from coconut shells which comprises cleaning the coconut shells, drying the cleaned coconut shells at a temperature within a first range, crushing the dried coconut shells, sieving the crushed coconut shells through 100-400 mesh to obtain uniform sized coconut shell powder, treating the shell powder with an activating agent, drying the treated coconut shell powder, carbonizing the powder in an inert atmosphere at a temperature within a second range of 300-400° for 3-6 h, cooling the carbonized powder to room temperature, activating the carbonized powder in an inert or oxidizing gas at a temperature within a third range of 600-700° C., said activating being carried out in an inert gas atmosphere to form the activated carbon powder with uniform pore size, cooling the activated carbon powder to room temperature, removing excess activating agent, washing with water to bring the powder to neutral pH and drying the washed powder to obtain the high surface area activated carbon with a nitrogen adsorption isotherm at 77 K, a BET surface area in the range 1500-2000 $m^2/g$ with average pore diameter 17-21 Å, layer and a capacitance in the range of 10-180 F/g.

2. A process as claimed in claim 1 wherein the activating agent is selected from the group consisting of 250 mM-2 M aqueous solutions of an alkali metal hydroxide, an alkali metal hydride, a carbonate, a chloride, a sulfide, a thiocyanate of a transition metal and an inorganic acid.

3. A process as claimed in claim 2, wherein the chloride is zinc chloride.

4. A process as claimed in claim 2, wherein the alkali metal hydroxide is potassium hydroxide.

5. A process as claimed in claim 1, wherein the inert gas is selected from the group consisting of nitrogen and argon.

6. A process as claimed in claim 1, wherein the carbonization is carried out at the second range in an inert atmosphere using different heating rates ranging from 5-20° C./min.

7. A process as claimed in claim 1, wherein the activation is carried out in a dynamic flow of the inert or oxidizing gas at a flow rate of 20-200 ml/min and at a heating rate of 5-20° C./min.

8. A process as claimed in claim 1, wherein the coconut shells are first cleaned mechanically to remove fibrous parts therefrom followed by a thorough rinsing with distilled water.

9. A process as claimed in claim 1, wherein the first range is 110-115° C. and the cleaned coconut shell is dried at a temperature in the first range for 12-20 h.

10. A process as claimed in claim 1, wherein the crushed coconut shell powder is sieved through 100-400 mesh to obtain uniform sized particles.

11. A process as claimed in claim 1, wherein the first range is 100-200° C. and the treated coconut shell powder is dried at a temperature in the first range for a period of 12-22 h.

12. A process as claimed in claim 1, wherein the excess activating agent is removed by treating with dilute hydrochloric acid followed by the washing with water.

13. A process as claimed in claim 1, wherein the first range is 110-115° C. and the cleaned coconut shell is dried at a temperature in the first range for 12-20 h.

14. The process as claimed in claim 1, wherein the activating of the carbon powder is performed in an atmosphere consisting of an inert gas for a time effective to form the activated carbon powder with uniform pore size.

15. A process for the preparation of high surface area activated carbon from coconut shells consisting essentially of: cleaning the coconut shells, drying the cleaned coconut shells at a temperature within a first range, crushing the dried coconut shells, sieving the crushed coconut shells through 100-400 mesh to obtain uniform sized coconut shell powder, treating the shell powder with an activating agent, drying the treated coconut shell powder, carbonizing the powder in an inert atmosphere at a temperature within a second range of 300-400° C. for 3-6 h, cooling the carbonized powder to room temperature, activating the carbonized powder in an inert or oxidizing gas at a temperature within a third range of 600-700° C., said activating being carried out for a time effective to form the activated carbon powder with uniform pore size; cooling the activated carbon powder to room temperature, removing excess of activating agent, washing with water to bring the powder to neutral pH and drying the washed powder to obtain the high surface area activated carbon with a nitrogen adsorption isotherm at 77 K, a BET surface area in the range 1500-2000 $m^2/g$ with average pore diameter 17-21 Å, layer and a capacitance in the range of 10-180 F/g.

16. A process as claimed in claim 15, wherein the activating agent is selected from the group consisting of 250 mM-2 M aqueous solutions of an alkali metal hydroxide, an alkali metal hydride, a carbonate, a chloride, a sulfide, a thiocyanate of a transition metal and an inorganic acid.

17. A process as claimed in claim 16, wherein the chloride is zinc chloride.

18. A process as claimed in claim 16, wherein the alkali metal hydroxide is potassium hydroxide.

19. A process as claimed in claim 15, wherein the inert gas is selected from the group consisting of nitrogen and argon.

20. A process as claimed in claim 15, wherein the carbonization is carried out at the second for 3-6 h, in the inert atmosphere and using different heating rates ranging from 5-20° C./min.

21. A process as claimed in claim 15, wherein the activation is carried out in a dynamic flow of the inert or oxidizing gas at a flow rate of 20-200 ml/min and at a heating rate of 5-20° C./min.

22. A process as claimed in claim 15, wherein the coconut shells are first cleaned mechanically to remove fibrous parts therefrom followed by a thorough rinsing with distilled water.

* * * * *